Aug. 10, 1965 E. A. SALERA 3,199,348
FLUID FLOW DETECTION APPARATUS
Filed May 1, 1961 2 Sheets-Sheet 1

INVENTOR.
EDMOND A. SALERA
BY *White and Haefliger*
ATTORNEYS

Aug. 10, 1965  E. A. SALERA  3,199,348
FLUID FLOW DETECTION APPARATUS
Filed May 1, 1961  2 Sheets-Sheet 2

INVENTOR.
EDMOND A. SALERA
BY White and Haefliger
ATTORNEYS

United States Patent Office 3,199,348
Patented Aug. 10, 1965

3,199,348
FLUID FLOW DETECTION APPARATUS
Edmond A. Salera, 714 Surf View Drive,
Santa Barbara, Calif.
Filed May 1, 1961, Ser. No. 106,685
7 Claims. (Cl. 73—204)

This invention relates generally to devices for sensing temperature of a fluid medium and also to instrumentation operable through fluid temperature sensing to measure relative motion of a fluid medium with respect to such instrumentation.

It is a major object of the invention to provide an improved device and components thereof for measuring with accuracy the rate of fluid flow relative to the device, the latter being characterized as entirely in solid state form, as distinguished from liquid or combination liquid and solid state devices. Certain disadvantages of liquid state devices, which are overcome by the present device, include environmental tendencies to solidify, evaporate and undergo changes in dimension. Further, solid state material can be relatively easily worked so as to be more readily produced at lower cost, and they are structurally more reliable and sound.

Advantageous applications of the combination device include its use as a flow meter, as for example a speed sensor on watercraft, and its use in fluid pipelines for measuring the rate of fluid flow therethrough. These are only illustrative examples of applications of the invention, there being many more which those skilled in the art and familiar with the invention will recognize.

The invention is also directed to the provision of novel solid state components or elements of a flow meter which may have individual use for detecting or sensing fluid temperature conditions as well as combination use in a flow meter. As broadly contemplated, this component instrumentality comprises electrically energizable means, typically but not necessarily a thermistor, having impedance that varies with temperature, and body means including thermally semi-conductive material in solid state, the body means being subject to exposure to the fluid medium in such relation to the electrically energizable means and the semi-conductive material that heat transfer between the fluid medium and the electrically energizable means tends to occur preferentially through the solid state material.

Further as regards such components, it is another major object of the invention to supply the need for a small, inexpensive electrical device in solid state which will accurately sense the ambient temperature of a fluid medium which may have changing motion relative to the device. In particular, the body means may have free surface extent exposable to the fluid and of such reduced area in relation to the overall size of the semi-conductive material that changes in the movement of constant temperature fluid relative to the body means are substantially ineffective to produce changes in the impedance of the electrically energizable means, whereas changes in the ambient temperature of the fluid are effective to produce changes in the impedance of the electrically energizable means.

A second novel solid state component and element of the combination flow meter instrument provides for a desired superposition of temperature sensing and flow sensing. This device is similar to the ambient temperature sensing component already mentioned, with the exception that the body means has free surface extent exposable to the fluid and of such relatively large area in relation to the overall size of the semi-conductive material that changes in the movement of constant temperature fluid relative to the body means are effective to produce changes in the impedance of the electrically energizable means, and changes in the ambient temperature of the fluid are also effective to produce changes in the impedance of the electrically energizable means. It will be noted at this point that the temperature change and flow rate change effects on the electrical means, as for example a thermistor, are felt by the electrical means as a result of heat transfer through the free surface extent of the body means and through the semi-conductive material, so that a superposition condition of these effects on the thermistor impedance is established. As a result, the combination solid state instrument embodying both of the components referred to is enabled, when electrically connected in an appropriately balanced circuit, to cancel the temperature sensing effect, thereby to derive absolute flow rate measurement.

These and other objects and advantages of the invention will be further understood from the following detailed description, in which.

Figure 7:
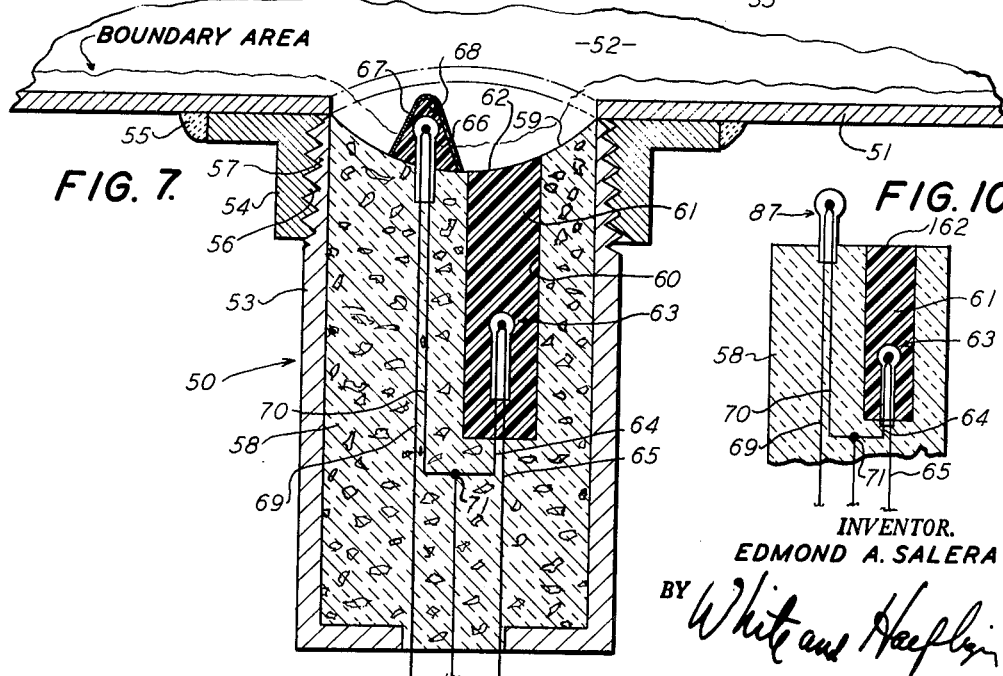
FIG. 7 is a vertical elevation in section through the combination device connected into a conduit and adapted for use in absolute fluid flow rate determination.
Figure 8:
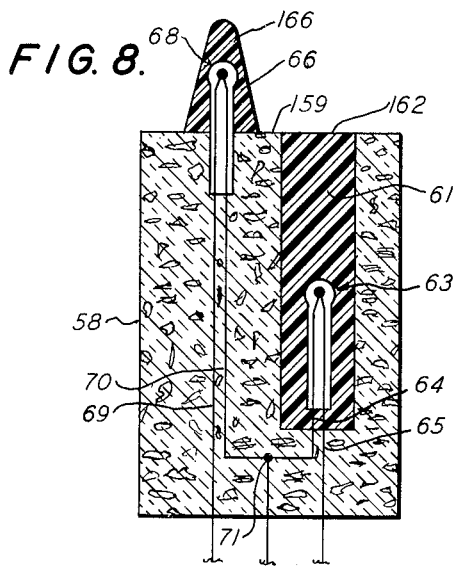
FIG. 8 is a vertical elevation in section through a modified combination device adapted for use in absolute fluid flow rate determination.
Figure 9:
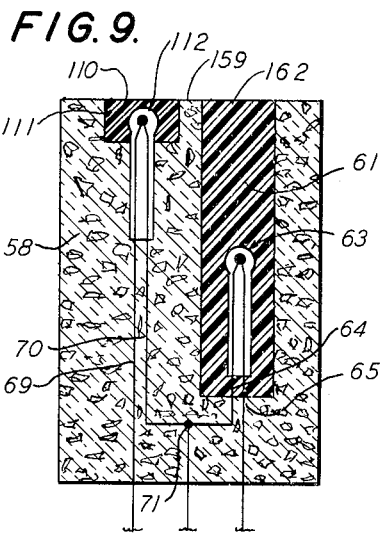
FIG. 9 is a view like FIG. 8 through another modified combination device adapted for use in absolute fluid flow rate determination.
Figure 11:
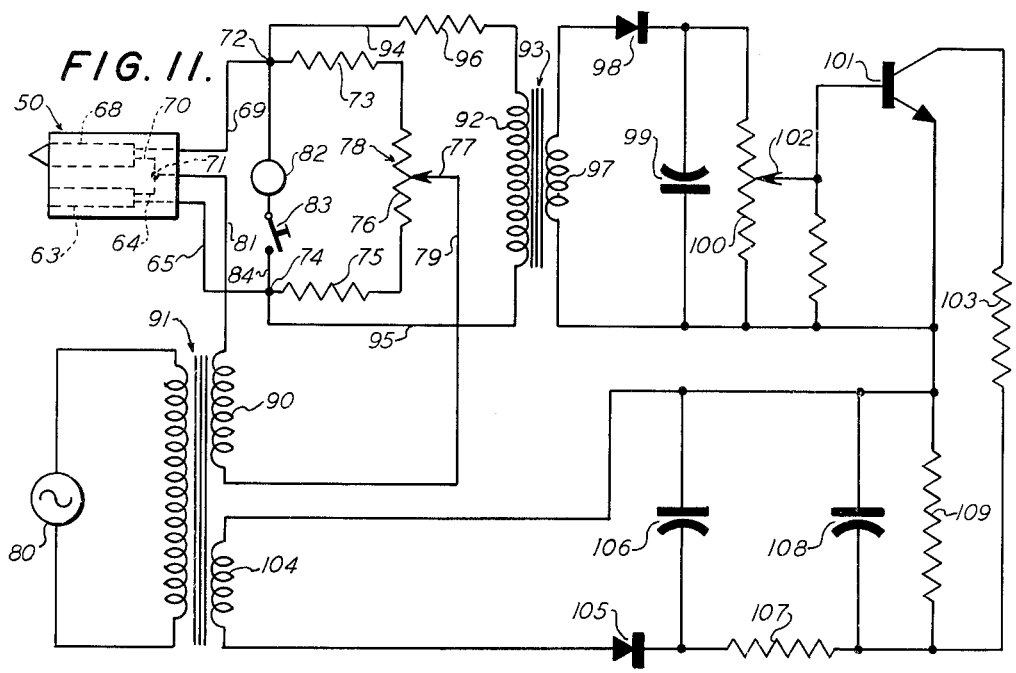
Figure 12:
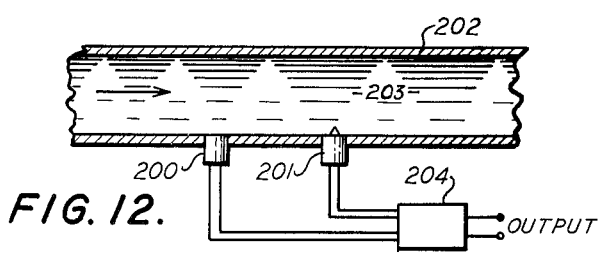

FIG. 11 is a circuit diagram showing interconnections of the temperature sensing and flow sensing components of any one of FIGS. 7 through 9; and FIG. 12 is a block form showing of the FIGS. 1 and 2, and FIGS. 3 and 4 units, as installed in a pipe and as connected in a circuit.

Figure 1:
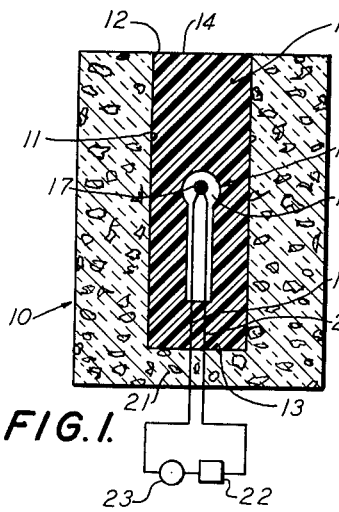
FIG. 1 is an enlarged vertical elevation in section through the so-called reference and ambient temperature sensing component.

In FIG. 1 the reference unit shown includes a body 10 made of heat insulating material such as plastic or ceramic, and typically but not necessarily comprising an epoxy-type resin containing pieces of cork or like highly heat insulative material. The body contains a cavity 11 which preferably but not necessarily takes the form of a cylindrical recess that is elongated between the recess mouth 12 and the interior wall 13 of the body 10.

The body 10 is adapted to be submerged in a fluid medium under conditions such that the medium has motion relative to the body, and particularly over the free surface extent 14 of a thermally semi-conductive and electrically insulative material 15 in solid state and occupying the cavity 11. As shown in FIG. 1, the material 15 substantially fills the cavity so that the material comprises an elongated mass having free surface extent 14 proximate one end of the mass.

Embedded within the material 15 is what may be characterized as electrically energizable means 16, typically but not necessarily a thermistor assembly, and characterized in that the means 16 has impedance that varies with temperature. If a thermistor assembly is used, as shown, it typically comprises a thermistor 17 as such, embedded within a glass envelope 18, which may be considered as thermally semi-conductive material and having lead wires 19 and 20 which project from the glass envelope 18, through the innermost extent of the semi-conductive material 15, and through the closed end portion 21 of the body 10. The projecting leads 19 and 20 may be connected through a D.C. or A.C. source 22 and an ammeter 23, the latter being capable of calibration in terms of temperature. As long as the supply voltage of the source 22 remains constant, the current flow will be determined only by the absolute temperature of the thermistor.

Figure 2:
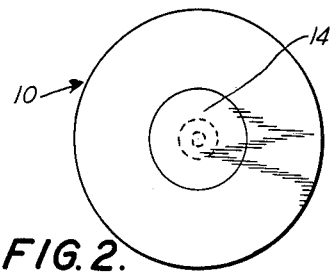
FIG. 2 is a plan view of the FIG. 1 component.

Further in connection with FIG. 1, it will be understood that the material 15, by itself, or together with the body 10, may be characterized as a body means. Also, the arrangement of the components and the compositions of the semi-conductive material 15 and body 10 may be varied as long as the body means remains exposable to the fluid medium in such relation to the electrically energizable means 16 and the semi-conductive material 15 that heat transfer between the fluid medium and the electrically energizable means tends to occur preferentially through the free surface extent 14 and the semi-conductive material 15. Furthermore, as respects the reference unit as shown in FIGS. 1 and 2, the arrangement of the components and their compositions may be varied so long as the free surface extent 14 is of such reduced area in relation to the overall size of the semi-conductive material 15 that changes in the movement of constant temperature fluid relative to the body means are substantially ineffective to produce changes in the impedance of the electrically energizable means. Thus, fluid in motion cools or adds little enough heat to the small surface 14 to be able to greatly change the interior temperature equilibrium of the large mass 15. On the other hand, changes in the ambient temperature of such fluid are effective to produce changes in the impedance of the electrically energizable means, it being understood that a time constant is involved. Thus, the term "thermally semi-conductive" as used in connection with material 15 means a material characterized in use as conducting the bulk of the heat transferred between the thermistor and the fluid medium.

While the semi-conductive material may comprise any electrically insulative material having a thermal coefficient of heat transfer such as to produce the desired results, it has been found that epoxy-type resins are particularly useful for this purpose, such resins being known. The body 10 may comprise any material such as to produce the desired results, but typically has a thermal coefficient of heat transfer less than that of the material 15, and may comprise epoxy resins containing granulated cork.

Further, describing the device shown in FIGS. 1 and 2, it will be observed that the ability of the semi-conductive material 15 to transfer heat is of the same order as its ability to act as an insulator of heat. The use of a solid semi-conductor as a heat transfer or heat exchanging medium is unique in that it provides for flexibility of heat stabilization of the transfer medium, and it also provides for loose coupling of the heat from the heater or electrically energizable means 16 to or into the fluid medium to which the radiating surface 14 is exposed. Because of the reduced size of the radiating surface 14 in relation to the overall size of the material 15 within the interior of which the means 16 is embedded, changes in the movement of constant temperature fluid relative to an adjacent surface 14, are substantially unable to change the interior temperature equilibrium of the large mass of semi-conductive 15, and therefore the impedance of the electrically energizable means 16 is not changed as a result of such changes in fluid movement. On the other hand, changes in the ambient temperature of the fluid are effective to produce changes in the impedance of the means 16 over considerable lengths of time. This time constant is kept to a minimum by proper sizing of the semi-conductor material 15 in relation to the free surface extent 14 thereof, and accordingly good sensitivity to ambient temperature changes, and poor sensitivity to changes in fluid movement, may be realized.

Figure 4:
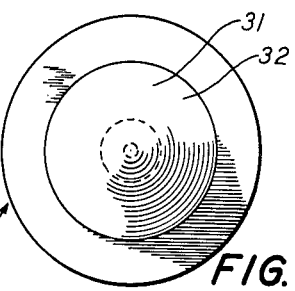
FIG. 4 is a plan view of the FIG. 3 component.
Figure 3:
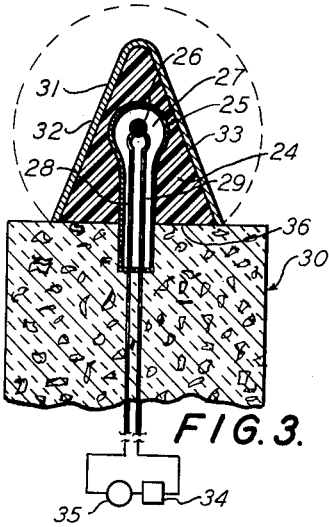
FIG. 3 is an enlarged vertical elevation in section through the so-called "snap-action" flow sensing component.

Referring now to FIGS. 3 and 4, the so-called "snap-action" flow unit, or fluid-flow sensor, comprises body means including thermally semi-conductive material 24 in solid state and in which the electrically energizable means 25 is embedded. The latter may typically but not necessarily comprise a thermistor assembly including a thermistor 26 as such within a glass envelope 27, and having lead wires 28 and 29 as shown.

The body means preferably includes a body 30 of relatively insulative material which is adjacent only part of the semi-conductive material 24. The body means may also include a thin metallic layer 31 on the projecting semi-conductive material 24, the layer 31 having free surface extent 32 of relatively large area in relation to the overall size of the semi-conductive material 24. If desired, the layer 31 may be eliminated, in which event the surface 33 of the material 24 would be free, and would have relatively large area in relation to the overall size of the material 24; however, the layer 31 is desirable for structural protection. It will be observed that while the material 24 has generally conical shape and projects away from the insulative body 30, the geometric relationships may be varied as long as the free surface extent referred to is of such relatively large area in relation to the overall size of the semi-conductive material 24 that changes in the movement of constant temperature fluid relative to the unit are effective to produce changes in the impedance of the electrically energizable means 25, and also changes in the ambient temperature of such fluid are effective to produce changes in the impedance of the means 25.

The lead wires 28 and 29 of the latter means may be brought through the envelope 27, in the case of a thermistor assembly, and through the body 30, for connection to a battery or alternating current source 34 and ammeter 35. Also, the semi-conductive material 24 may comprise any of the materials previously discussed in connection with the semi-conductive material 15. The body 30 comprises a heat insulator such as epoxy resin containing distributed particles of cork, or like material, it being understood that other heat insulators may be used.

Further characterizing the unit shown in FIGS. 3 and 4, the relatively large area of the free surface extent 32 in relation to the mass or size of the material 24 provides for tight coupling of the heat transfer from the heater or means 25 to or into the fluid medium to which the radiating surface 32 is exposed. In the presence of a change in fluid movement, the heat stabilized mass of material 24 is quickly unstabilized, thereby creating a change in the power dissipation characteristics of the heater or means 25, and also changes in the ambient temperature of the fluid medium unstabilize the heat transfer relationships through the mass of the material 24. Upon establishment of new conditions of stability as respects heat transfer through the mass 24, the impedance of the means will in general be changed, and will be reflected in a change of the reading of the ammeter 35, which may be calibrated as desired to indicate changes in fluid flow rates.

It will also be seen in FIG. 3 that the base 36 of the solid state material 24 is in intimate contact with the efficient insulator or body 30 for the purpose of excluding any conduction of heat from the material 24 to any body other than the fluid medium. In other words, effectively all of the heat transfer is between the means 25 and the fluid medium.

Figure 6:
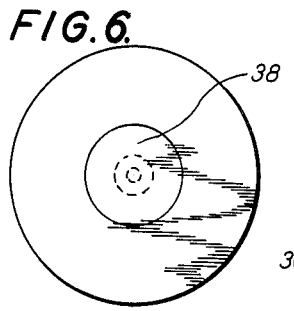
FIG. 6 is a plan view of the FIG. 5 component.
Figure 5:
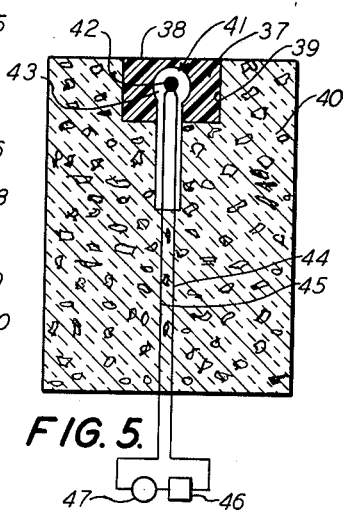
FIG. 5 is an enlarged vertical elevation in section through a modified flow sensing component.

Referring now to FIGS. 5 and 6, the operation of the unit shown is the same as that described in connection with FIGS. 3 and 4. As illustrated, it comprises body means including a mass of semi-conductive material 37 having free surface extent 38 the arrangement of which is large in relation to the mass or size of the material 37. The latter is received within a cavity 39 in the insulative body 40, and the materials of these body means components may comprise the same as discussed above.

Embedded in the material 37 is an electrically energizable means 41 which may typically but not necessarily comprise a thermistor assembly including a thermistor 42, embedded in a glass envelope 43, the thermistor having lead wires 44 and 45 which project through the envelope and through the body 40. As illustrated, the lead wires are connected in the series circuit that includes an alternating or direct current source 46 and an ammeter 47 functioning as described above in connection with FIG. 3. Likewise, the operation of the unit shown in FIGS. 5 and 6 is substantially the same as described in connection with FIGS. 3 and 4.

Reference is now made to FIG. 7 showing a fluid flow meter assembly 50 in combination with a wall 51 such as a pipewall or the hull of a vessel, there being a fluid medium 52 flowing relatively to the wall 51 at the inner side thereof. The assembly 50 is located generally at the outside of the wall 51 and includes a shell 53 which may have any suitable connection to the wall, as by means of an adapter 54 joined at 55 to the wall, and interiorly threaded at 56 to receive the exteriorly threaded extent 57 of the shell 53. These connections are only illustrative and may be varied.

The shell 53 contains insulative material 58 which may typically but not necessarily comprise epoxy resin containing particles of cork, it being understood that other insulative materials may be used. The material 58 has a surface 59 which is recessed or dished generally away from the fluid 52 at the inner side of the wall 51, but remains exposed to such fluid for free contact therewith. The material 58 furthermore contains a cavity 60 receiving a mass of semi-conductive material 61 the same as previously discussed in connection with FIGS. 1 and 2. Such material has free surface extent 62 which is reduced in relation to the overall size of the material 61, and electrically energizable means 63 is embedded within the material 61 generally remote from the surface 62 so as to provide for loose coupling of heat transfer between the fluid 52 and the means 63. The latter may typically but not necessarily comprise a thermistor assembly, and it is provided with leads 64 and 65 as illustrated.

A second mass of thermally semi-conductive material is shown at 66 projecting away from the surface 59 of the insulator body 58 and into the fluid 52. The second mass 66 may comprise the same material as discussed in connection with FIG. 3, and it may or may not be covered with a thin protective metallic layer 67 for purposes as previously described. In any event, there is free surface extent on the layer 67 or on the second mass 66 which is of such large area in relation to the overall size of the second mass 66 that changes in the movement of constant temperature fluid relative to the body means or assembly 50 are effective to produce quick changes in the impedance of the electrically energizable means 68 embedded within the mass 66, and also changes in the ambient temperature of the fluid are effective to produce changes in the impedance of the means 63 as well as the means 68.

As previously described, the free surface extent 62 of the material 61 is of such reduced area in relation to the size of the mass 61 that changes in movement of constant temperature fluid relative to the body or assembly 50 are substantially ineffective to produce changes in the impedance of the first electrically energizable means 63. In other words, the means 63 may be said to be loosely coupled to the fluid as respects heat transfer therebetween; whereas, the means 68 may be said to be tightly coupled to the fluid as respects heat transfer therebetween. The leads of the means 68 are shown at 69 and 70.

Referring now to FIG. 11, the two devices 63 and 68 are shown having their leads connected into opposite legs of a Wheatstone bridge circuit. Thus, lead 70 of the device 68 is interconnected at 71 with the lead 64 of the device 63. Also, lead 69 is connected at 72 with a fixed resistor 73, and lead 65 of the device 63 is connected at 74 with a fixed resistor 75. Finally, the two resistors 73 and 75 are interconnected through the potentiometer resistance 76. The wiper 77 from the potentiometer 78 is connected by lead 79 to one side of the A.C. or D.C. power suply 80, and a lead 81 connects the junction 71 with the other side of the power supply. Finally, the output of the bridge circuit appears across the junction 72 and 74, and may be registered on a suitable meter 82 when the switch 83 in line 84 is closed.

For balancing the bridge, the assembly 50 may be connected into the wall 51 under conditions such that the fluid 52 has no movement, and also has constant ambient temperature. Accordingly, the sensors or electrically energizable means 63 and 68 are affected only by the ambient temperature of the fluid, thereby determining the stabilization point of each sensor in terms of stabilizing impedance or resistance. Because of the differences in configurations as between the sensors within their semi-conductive envelopes, small differences in stabilization points of the sensors may occur, which differences may be compensated by adjustment of the potentiometer wiper 77. When such compensation has been accomplished, the bridge may be considered as balanced in that the output of the meter 82 with switch 83 closed is zero.

Should the ambient temperature of the fluid 52 change, the bridge will remain balanced because the resistance of both of the sensors 63 and 68 will change in like manner, it being understood that ambient temperature changes will be generally of such slow rate as to be within the time constant characteristic of the sensor 63 and its associated semi-conductive material 61.

On the other hand, should there be changes in fluid movement relative to the assembly 50, the sensor 63 remains substantially insensitive to fluid movement, in terms of changes of resistance in response to such fluid movement changes, whereas the resistance of the sensor 68 will quickly change in response to fluid movement changes, all for reasons discussed above. Accordingly, the bridge will become unbalanced in proportion to the change of fluid movement, which unbalance will appear at the meter 82 which may be calibrated to read in terms of fluid movement relative to the assembly 50.

FIG. 11 also incorporates circuit means operable to energize a load only in response to a preselected change or condition of fluid flow relative to the assembly 50. For example, an output load may be energized when the fluid flow increases to a selected value.

For this purpose, and for the purpose of isolation, to prevent excessive loading of the bridge and to provide efficient coupling of the bridge output power, the high impedance winding 92 of a step down transformer 93 is connected across the bridge output through connectors 94 and 95. A resistor 96 is in addition placed in series with high impedance winding 92 further to exclude the possibility of excessive bridge loading due to large bridge unbalance conditions caused by excessive flow rates over sensor 50. The inclusion of resistor 96 is particularly useful and of great influence in opposing loading of the bridge during initial power turn on and warm up periods, for under these conditions the bridge prevents the sensor elements from reaching operating temperature in a short period of time, which is not desirable because of the long warmup time involved.

The low impedance winding 97 of transformer 93 serves to properly and efficiently couple the available power into the following D.C. amplifier stage. Because the amplifier stage is a D.C. operated device, it is desirable to rectify the available A.C. power in winding 97 to D.C. power. This is typically accomplished by use of a half wave rectifier comprising diode 98 and filter capacitor 99. The half wave rectifier D.C. power appears across potentiometer 100 and is applied to the base of a transistor 101 through wiper contact 102.

The application of the potentiometer 100 is unique, in that it provides means for pre-selecting the operation of a load device 103 in accordance with a selected flow rate over sensor 50. This is possible because the signal as applied to the base of the amplifier transistor 101 can be made proportional to the bridge output as caused by the sensor reaction to variously selected flow rates. In practice, a particular flow rate provides for a proportional amount of power to be developed across potentiometer 10. Through adjustable contact 102, the power just necessary to maintain conduction in transistor 101 is made available to the base of 101. For this particular setting of contact 102, any power product of sensor 50 due to flow rates equal to or greater than the particular setting will allow the transistor to furnish power to the load. Also, any power product of sensor 50 less than the particular previous setting will turn off the power to the load.

D.C. bias for transistor 101 is made available by rectifying the available A.C. power in output winding 104 of transformer 91, the rectifying action being typically accomplished by a half wave rectifier comprising diode 105 and the filter section comprising capacitor 106, resistor 107, and capacitor 108. Resistor 109 provides for bleeder action and voltage selection.

Figure 10:
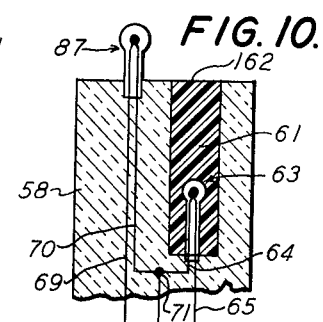
FIG. 10 is another view like FIG. 8 showing another modification.

Reference to FIG. 8 shows a fluid movement sensing device the same as discussed in connection with FIG. 7, with the exception that the surface 159 of the insulative body 58 and the free surface 162 of the semi-conductive material 61 are in the same flat plane instead of dished as shown in FIG. 7. Also, there is no thin metallic layer applied to the second mass of semi-conductive material 66, so that the surface 66 of the latter is freely exposed. FIG. 9 shows a further modified device, the same as illustrated in FIG. 8, with the exception that the second mass of semi-conductive material shown at 110 is received within a cavity 111 sunk into the surface 159 of the insulative body 58. Likewise, the electrically energizable means 112 when embedded within the semi-conductive material 110 is below the level of the surface 159. Finally, FIG. 10 shows a further modified device with a thermistor 87 in its electrically insulative glass envelope projecting into the fluid stream from the insulative body 58. The envelope need not comprise glass, but may comprise any other electrically insulative and thermally semi-conductive material.

FIG. 12 shows a block form "reference suit" 200, typically of the form described in FIGS. 1 and 2, and a block form "flow sensing unit" 201, typically of the form described in FIGS. 3 and 4. Units 200 and 201 are connected into a pipe 202 so as to be in heat transfer relation with the fluid medium 203 therein, but the units are at spaced locations, as shown. Finally, the units are connected into a circuit shown in block form at 204, the circuit typically functioning to produce an output signal that varies with changes in movement of the fluid medium 203. Circuit 204 may typically, but not necessarily, have the design shown in FIG. 11. One advantage of the FIG. 12 construction is found in the facilitation of installation of the separate units 200 and 201 in smaller pipes or working areas.

I claim:

1. A fluid flow meter assembly, comprising a pair of electrically energizable devices having impedance that vary with temperature, and body means including first and second masses of thermally semi-conductive and electrically non-conductive material in solid state and in which said devices are respectively embedded, said body means having first and second free surface extents exposable to the fluid medium in such relation to said means and devices that heat transfer between said fluid medium and first device occurs preferentially through said first free surface extent and first mass and heat transfer between said fluid medium and second device occurs preferentially through said second free surface extent and second mass, said body means also including heat insulative material in which the first mass is embedded with said first free surface extent exposed to the exterior proximate said second free surface extent, said first device being sufficiently spaced from said first free surface extent and interiorly of said heat insulative material and said first free surface extent being of such reduced area in relation to the size of the first mass that changes in movement of constant temperature fluid relative to said body means are substantially ineffective to produce changes in the impedance of said first device, the second free surface extent being of such large area in relation to the size of the second mass that changes in the movement of constant temperature fluid relative to said body means are effective to produce changes in the impedance of said second device, changes in the ambient temperature of the fluid medium being effective to produce changes in the impedances of both said devices.

2. The invention as defined in claim 1 including means to interconnect said devices for electrical energization thereof and for deriving a signal therefrom that varies with changes in the movement of the fluid medium relative to said body means.

3. The invention as defined in claim 1 in which said insulative material has a face exposable to the fluid medium, said first free surface extent being exposed at said face and said second mass projecting from said face.

4. The invention as defined in claim 3 in which said second mass has frusto-conical surface extent.

5. The invention as defined in claim 1 including a bridge circuit containing said devices in such relation as to cancel changes in impedance effects resulting from changes in the ambient temperature of the fluid medium.

6. The invention as defined in claim 5 including additional circuit means interconnected with said bridge circuit for producing a changed electrical control signal only when the movement of the fluid medium relative to the body means exceeds a predetermined flow rate.

7. The invention as defined in claim 6 in which said additional circuit means includes means to supply alternating current to the bridge input, means to receive and rectify an alternating current signal from the bridge output, load means, and means becoming electrically conductive to energize said load means only in response to application thereto of a predetermined value of said rectified signal.

References Cited by the Examiner

UNITED STATES PATENTS

| | | | |
|---|---|---|---|
| 1,858,265 | 5/32 | Dahlstrom. | |
| 2,740,031 | 3/56 | Addink | 73—362 |
| 2,753,714 | 7/56 | Perkins et al. | 73—362 |
| 2,816,997 | 12/57 | Conrad | 73—362 |
| 2,818,482 | 12/57 | Bennett | 73—362 |
| 2,859,617 | 11/58 | Adams | 73—204 |
| 2,886,683 | 5/59 | Klavitter | 73—362 |
| 2,924,972 | 2/60 | Biermann | 73—204 |
| 2,933,708 | 4/60 | Elliot et al. | 73—342 X |
| 2,947,938 | 8/60 | Bennett | 73—204 |
| 2,961,625 | 11/60 | Sion | 338—28 |
| 2,986,925 | 6/61 | Gentry et al. | 73—204 |

RICHARD C. QUEISSER, *Primary Examiner.*

ROBERT L. EVANS, DAVID SCHONBERG,
*Examiner.*